United States Patent [19]

Yokota et al.

[11] Patent Number: 5,707,077

[45] Date of Patent: Jan. 13, 1998

[54] AIRBAG SYSTEM USING THREE-DIMENSIONAL ACCELERATION SENSOR

[75] Inventors: Yoshihiro Yokota, Katsuta; Akira Koide, Ibaraki-ken; Masahiro Matsumoto, Hitachi; Masahide Hayashi, Katsuta, all of Japan

[73] Assignee: Hitachi, Ltd., Japan

[21] Appl. No.: 479,451

[22] Filed: Jun. 7, 1995

Related U.S. Application Data

[63] Continuation-in-part of Ser. No. 978,397, Nov. 18, 1992, Pat. No. 5,441,300.

[30] Foreign Application Priority Data

Nov. 18, 1991 [JP] Japan .................................. 3-301514

[51] Int. Cl.[6] .................................................. B60R 21/32
[52] U.S. Cl. .................. 280/735; 73/514.32; 361/283.2; 361/283.3
[58] Field of Search ........................ 280/734, 735; 73/517 R, 517 B, 514.32; 361/280, 283.1, 283.2, 283.4, 282.4

[56] References Cited

U.S. PATENT DOCUMENTS

| | | | |
|---|---|---|---|
| 4,950,914 | 8/1990 | Kurihara et al. | 280/735 |
| 5,101,669 | 4/1992 | Holm-Kennedy et al. | 361/280 |
| 5,151,763 | 9/1992 | Marek et al. | 361/280 |

*Primary Examiner*—Eric D. Culbreth
*Attorney, Agent, or Firm*—Evenson, McKeown, Edwards & Lenahan, P.L.L.C.

[57] ABSTRACT

A three-dimensional acceleration sensor capable of detecting a small acceleration value and even an acceleration value amounting up to 100 G occurring in the event of a collision has a diaphragm for linking a frame and a massive part, and diaphragms and beams for linking the massive part and a central part. These elements are formed by working a single crystalline silicon plate. Gaps between the massive part and opposing electrodes are changed by acceleration applied to the massive part. A circuit connected to terminals detects the changes in gaps as changes in capacitances and determines direction and level of the applied acceleration.

10 Claims, 15 Drawing Sheets

AIRBAG SYSTEM USING THREE-DIMENSIONAL ACCELERATION SENSOR

This application is a continuation-in-part of application Ser. No. 07/978,397, filed Nov. 18, 1992, now U.S. Pat. No. 5,441,300.

BACKGROUND AND SUMMARY OF THE INVENTION

The present invention relates to a three-dimensional acceleration sensor which can be used for an airbag actuated in the event of a collision of such a moving body as an automobile and for an active suspension in car body control.

A conventional three-dimensional acceleration sensor is described in, for example, 91CH2817-5/91, IEEE, 1991, pp. 655–658. The conventional sensor is finely worked through surface micro-machining. Structurally, it has a massive part, and a central part provided inside the massive part, and the massive part is suspended by the central part and thin beams.

Since in the conventional apparatus the central part and the massive part are linked by only the thin beams, the sensor faces a problem of poor strength and is allowed to detect only acceleration values of approximately 1 G to 2 G.

Also, in the conventional sensor, the structure of gap and movable electrode is set up by removing all superfluous layers and consequently the gap is exposed externally, raising a problem that inflow of dirts and moisture to the electrode is inevitable.

An object of the present invention is to provide a three-dimensional acceleration sensor capable of detecting a large value of acceleration.

Another object of the invention is to provide a three-dimensional acceleration sensor which is constructed such that electrodes can be prevented from being deposited with dirts and the like.

To accomplish the above objects, in a three-dimensional acceleration sensor having a support on which a stationary electrode is arranged, a central part fixed to the support, a massive part acting as a movable electrode and a link member for interconnecting the central part and the massive part, the link member is comprised of a combination of diaphragms and beams which are provided around the central part.

Also, to accomplish the above objects in accordance with the present invention, in a three-dimensional acceleration sensor having a support on which a stationary electrode is arranged, a central part fixed to the support, a massive part acting as a movable electrode and a first link member for interconnecting the central part and the massive part, a frame is provided around the massive part, and the frame and the massive part are linked by a second link member comprised of a diaphragm.

According to the invention, in a three-dimensional acceleration sensor having a support on which a stationary electrode is arranged and a massive part acting as a movable part, a frame is provided around the massive part, and the frame and the massive part are linked by a link member comprised of a diaphragm.

According to the invention, in a three-dimensional acceleration sensor having a support on which a stationary electrode is arranged and a massive part acting as a movable electrode, the distance between an electrode portion of the massive part and the stationary electrode is larger than that between the support and the massive part.

Since in the invention the central part and the massive part are linked by the diaphragms and beams, strength can be increased to permit detection of even an acceleration value of about 100 G.

Further, since the outer frame and the massive part are linked by the diaphragm, inflow or invasion of dirts and moisture from the outside can be prevented to prevent erroneous operation of the massive part.

DESCRIPTION OF THE PREFERRED EMBODIMENTS

Figure 1:
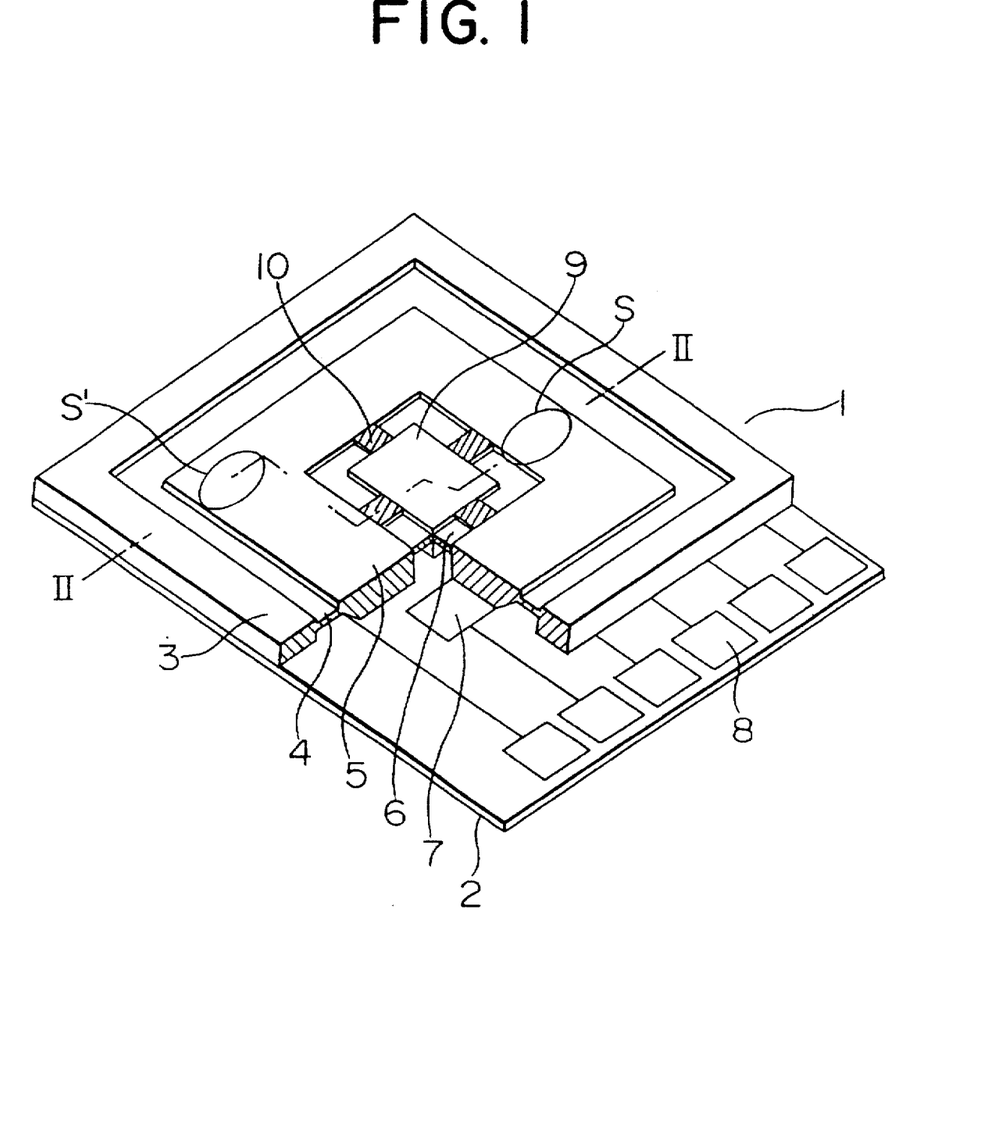
FIG. 1 is a perspective view showing an embodiment of a three-dimensional acceleration sensor according to the invention.
Figure 2:
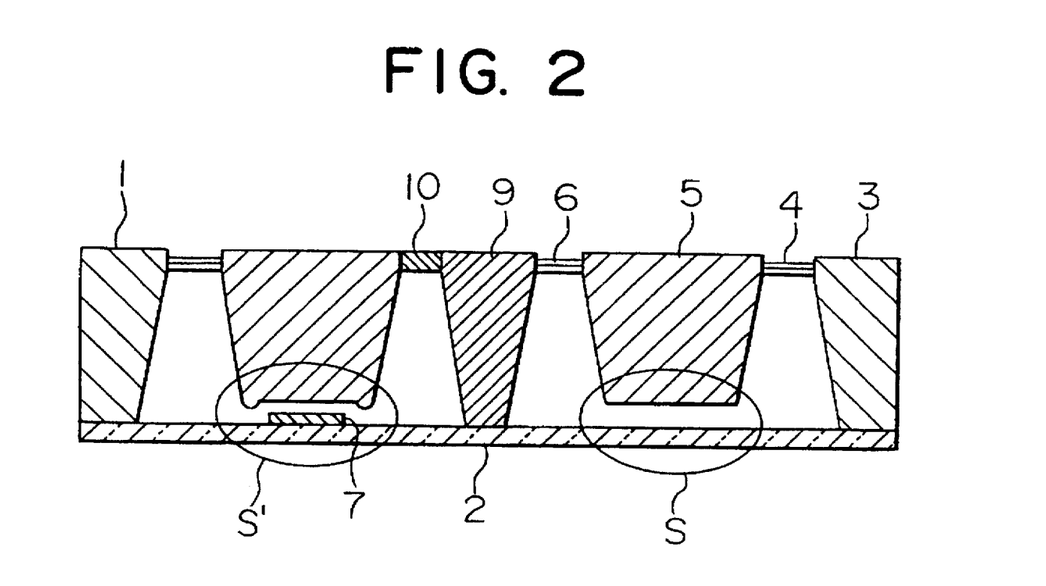
FIG. 2 is a sectional view taken on the line A–A' of FIG. 1.

Referring now to FIGS. 1 and 2, a single crystalline silicon plate 1 is worked to simultaneously form a frame 3, a massive part 5, a diaphragm 4 for interconnecting or linking the frame and massive part, and a central part 9 as well as beams 10 and diaphragms 6 for interconnecting or linking the massive part 5 and the central part 9.

When the massive part 5 is moved in accordance with acceleration, the movement can be brought into balance by a combination of beams 10 and diaphragms 6, and the balance may be additionally taken by the diaphragm 4.

While the massive part 5 is movable, the silicon substrate 1 per se is stationary and formed integrally with a glass plate or support 2 by, for example, anodic bonding as shown in FIG. 1. When a gap G (see FIG. 4) between a stationary electrode 7 formed on glass plate 2 and the massive part 5 changes in accordance with acceleration applied to the opposing massive part 5, a change in the gap complying with the acceleration is detected as a change in capacitance. The detection output is connected to a circuit through a terminal 8 so as to be taken out as an acceleration signal.

Thickness and width of the diaphragms 6 and 4 may be combined in such a way as to find an optimum condition for enabling the massive part 5 to operate steadily in order to detect acceleration values extending from 1 to 3 G necessary for car body control up to 100 G occurring in the event of a collision.

Figure 11:
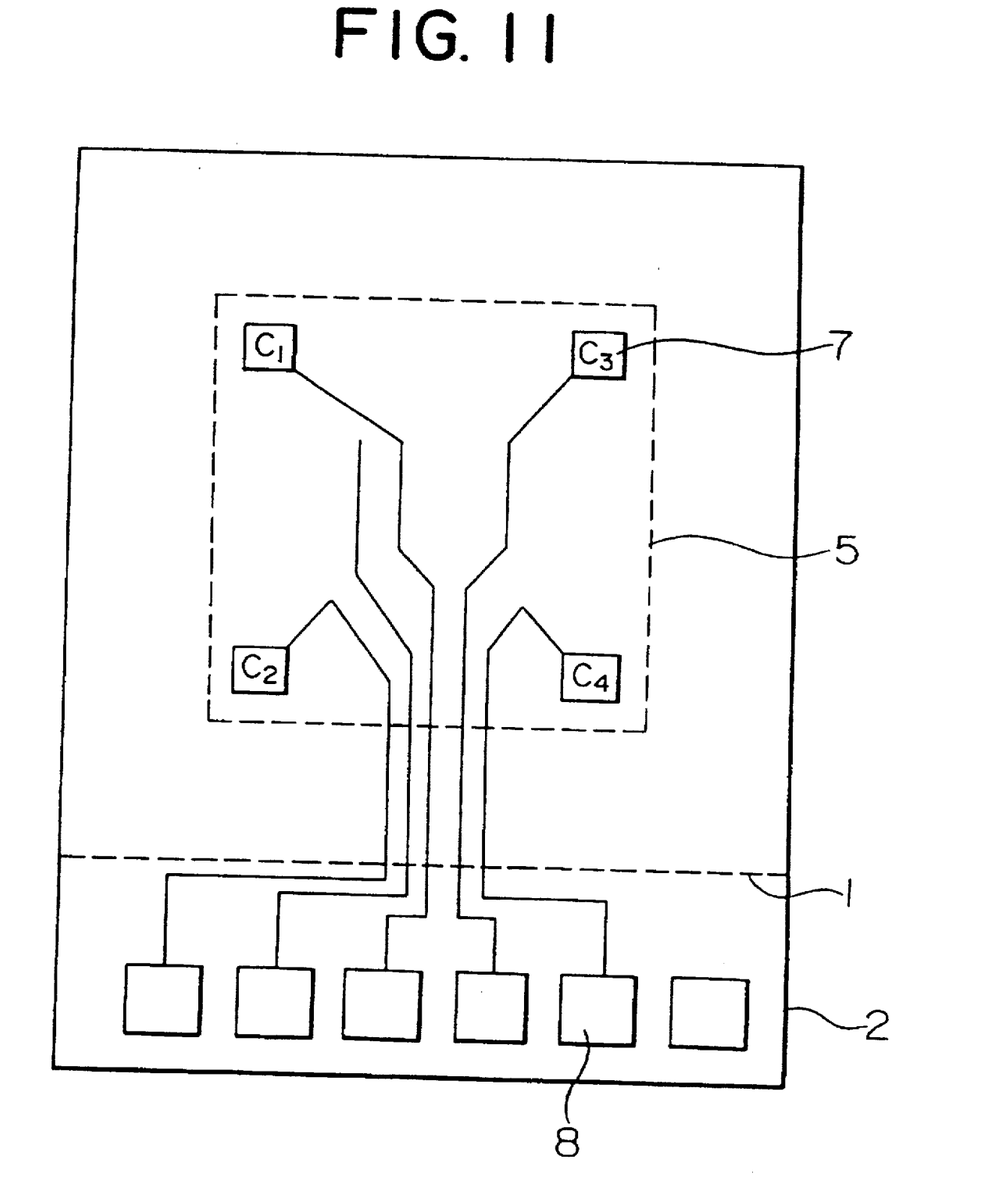
FIG. 11 is a diagram showing an example of an arrangement of electrodes.

The direction of acceleration applied can also be determined by detecting a change in capacitance between the electrode 7 and massive part 5 at a portion S' on the 2—2 section line, which change follows the movement of the massive part 5. To this end, a plurality of electrodes 7 are provided at, for example, four corners of the massive part 5 as shown in FIG. 11. When changes in capacitances $C_1$, $C_2$, $C_3$ and $C_4$ at the four sites are identical with each other, acceleration is so determined as to be applied vertically (Z direction) and when the difference between capacitance $C_1$ and $C_2$ at lefthand two sites and capacitances $C_3$ and $C_4$ at righthand two sites increases or decreases, acceleration is so determined as to be applied in the X direction. In a similar manner, the application of acceleration in the Y direction, which is at 90° angle to the X direction, is determined, so that a three-dimensional acceleration sensor may be provided. More particularly, where changes in capacitances at the respective gaps are $C_1$ to $C_4$, the Z, X and Y directions are determined by as follows:

$$Z \ldots C_1 = C_2 = C_3 = C_4$$

$$X \ldots (C_1, C_2) \text{-} (C_3, C_4)$$

$$Y \ldots (C_1, C_3) \text{-} (C_2, C_4)$$

Figure 13:
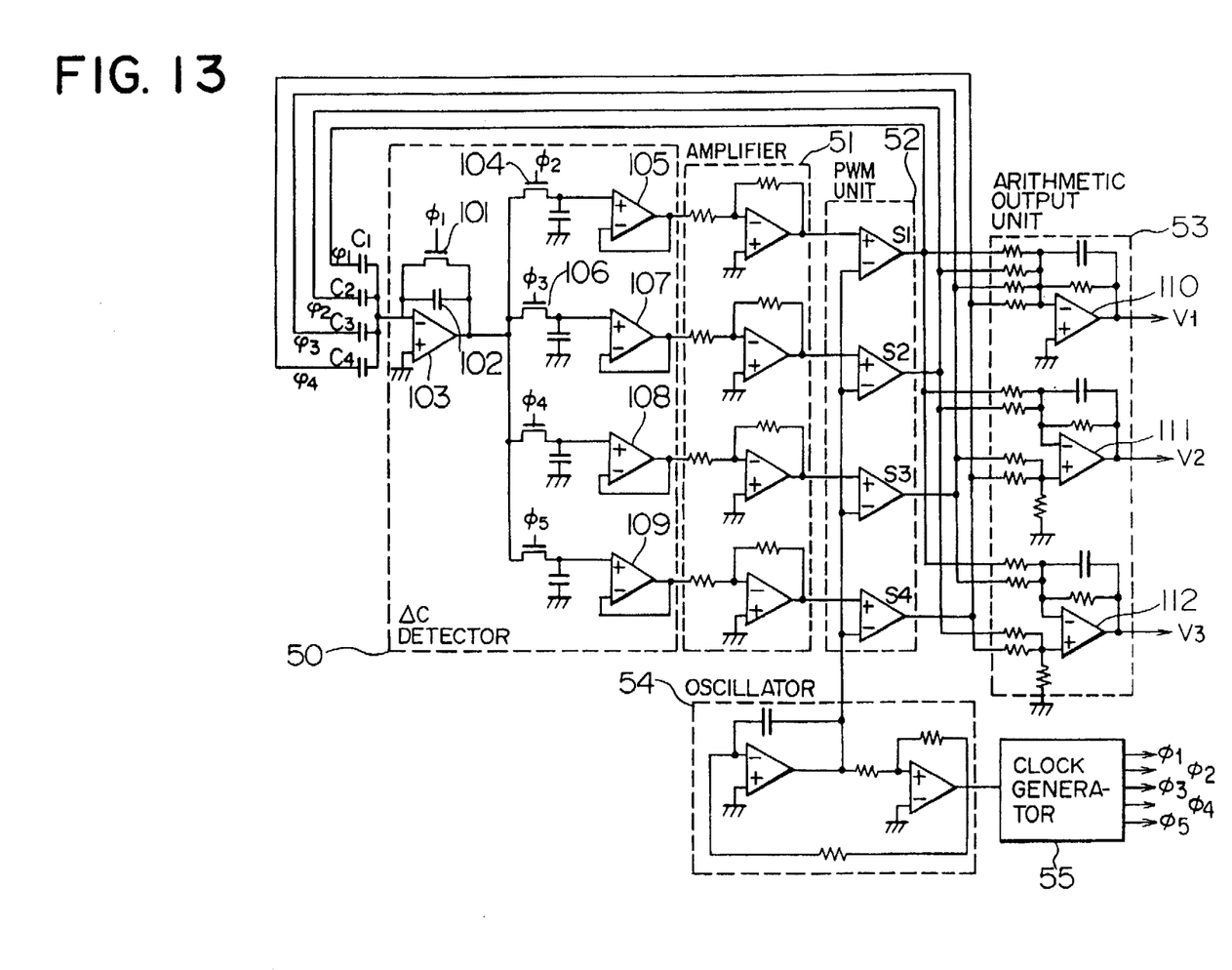
FIG. 13 is a circuit diagram of the three-dimensional acceleration sensor.

The above calculation may be carried out at an arithmetic output unit 53 constituting the final stage of a circuit shown in FIG. 13 to produce outputs V1 (Z direction), $V_2$ (X direction) and $V_3$ (Y direction) on the basis of which the system determines directions of applied acceleration.

Figure 3:
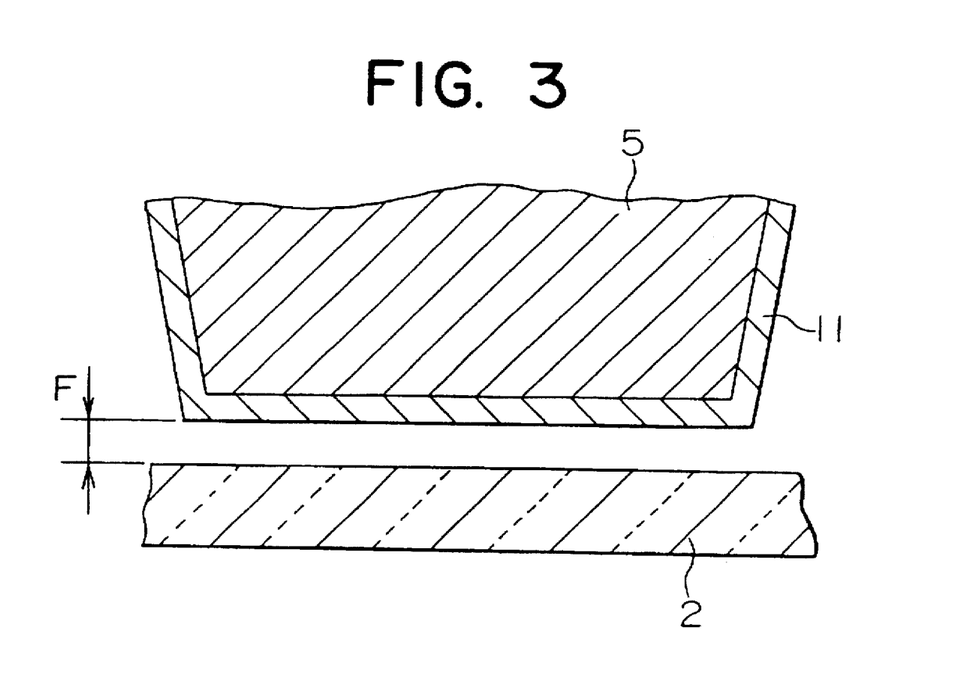
FIG. 3 is an enlarged cross sectional view showing a portion S in FIG. 1.
Figure 4:
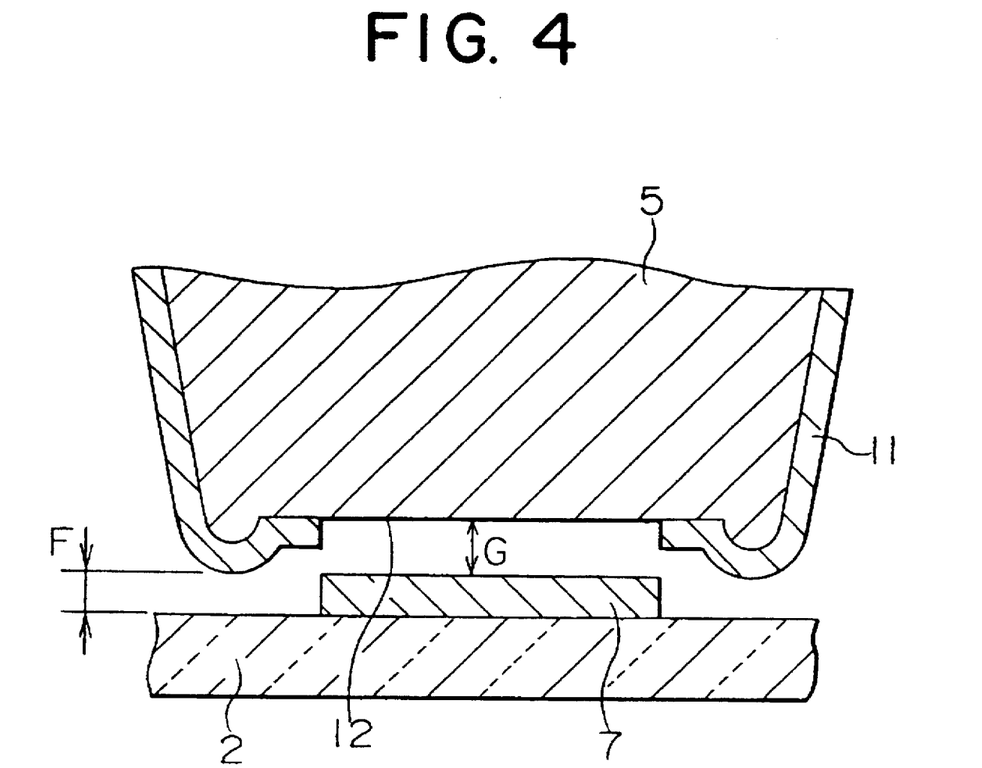
FIG. 4 is an enlarged cross sectional view showing a portion S' in FIG. 1.

Referring now to FIGS. 3 and 4 being enlarged views at portions S and S' of FIGS. 1 and 2, there are illustrated gaps one of which is for detection of capacitance. When electrodes are located at four corners of the massive part 5 as in an example of electrode arrangement shown in FIG. 11, an electrode 7 is present at the intermediate S' portion of FIG. 2 but no electrode is present at the S portion. At the S' portion, the massive part 5 is etched off in advance at its portion corresponding to an electrode portion 12 (FIG. 4) and a SiO$_2$ film 11 is deposited on the massive part to cover the electrode portion 12 as a result, a portion of the massive part opposing an electrode 7 is etched to expose an Si portion of the massive part 5 to form an electrode, as shown in FIG. 4.

Thus, a gap G for capacitance detection can be set up. A gap F for the stopper can also be set up in a similar way as shown in FIG. 4. The gaps constructed as above are effective to prevent a conductor of the electrode 7 from contacting the bare Si portion even when acceleration is applied.

Both the glass plate 2 and the SiO$_2$ film 11 at the gap F for the stopper are insulators which are immune to electrostatic fusion. The gap F is always related to the gap G as follows:

F<G.

Both gaps F and G are also used in combination to establish a detector of a self-diagnostic circuit. More particularly, a value of the gap G for capacitance detection is detected when the SiO$_2$ film 11 abuts against the glass plate 2 to make the gap F for the stopper zero. If this value falls within a preset range, normality is determined, but if this value is outside the range, a fault of the three-dimensional system is determined, raising the alarm. An alarm circuit for warning of abnormality by using the gaps F and G shown in FIGS. 3 and 4 is sophisticated but known and thus simply illustrated at block 58 in FIG. 13.

Further, by making the gap F for the stopper small pursuant to the relation of F<G, abnormal vibration of the massive portion 5 can be suppressed.

Figure 5:
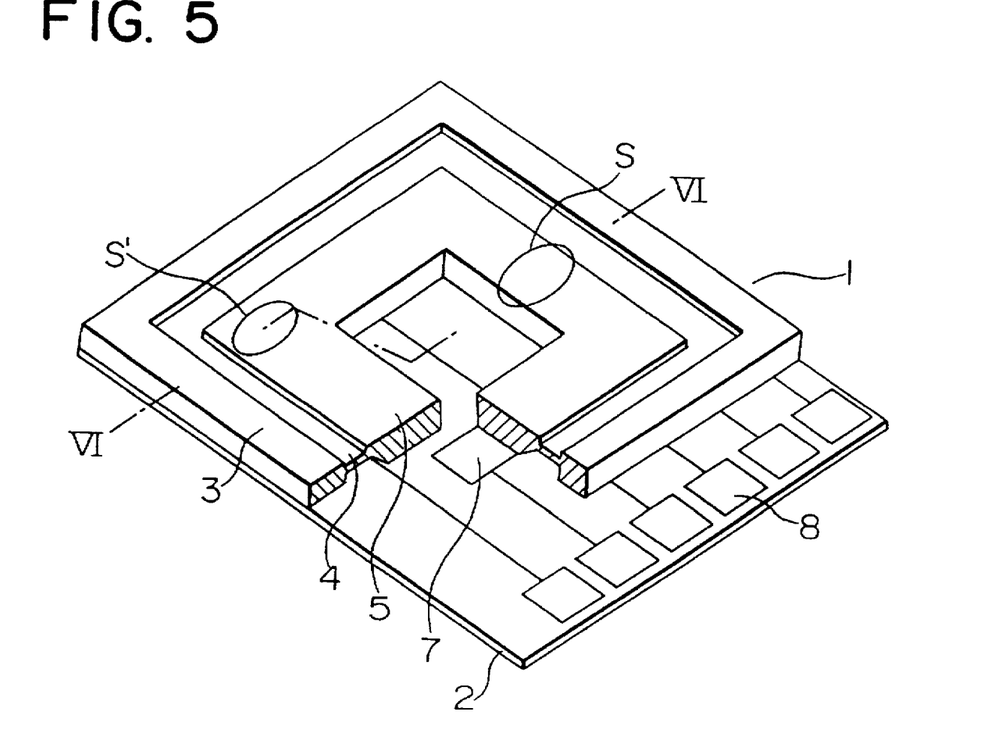
FIG. 5 is a perspective view showing a second embodiment of the three-dimensional acceleration sensor according to the invention.
Figure 6:
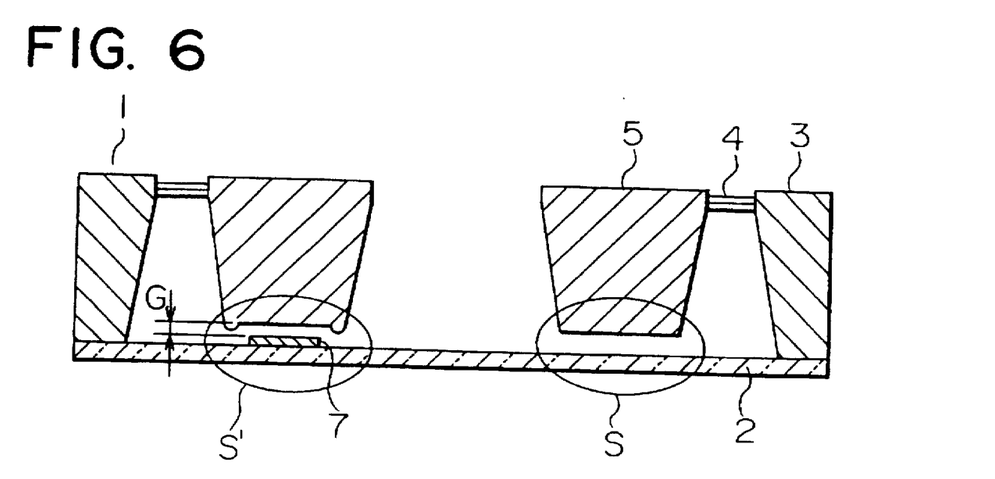
FIG. 6 is a sectional view taken on the line B–B' of FIG. 5.

FIGS. 5 and 6 show a second embodiment of the invention in which the central part 9 and the diaphragms 6 and beams 10 connected thereto of the FIG. 1 embodiment are removed. The operation of this embodiment is similar to that of FIG. 1, and structurally, this embodiment is simplified as compared to the FIG. 1 structure but the load on the diaphragm 4 becomes larger.

Figure 7:
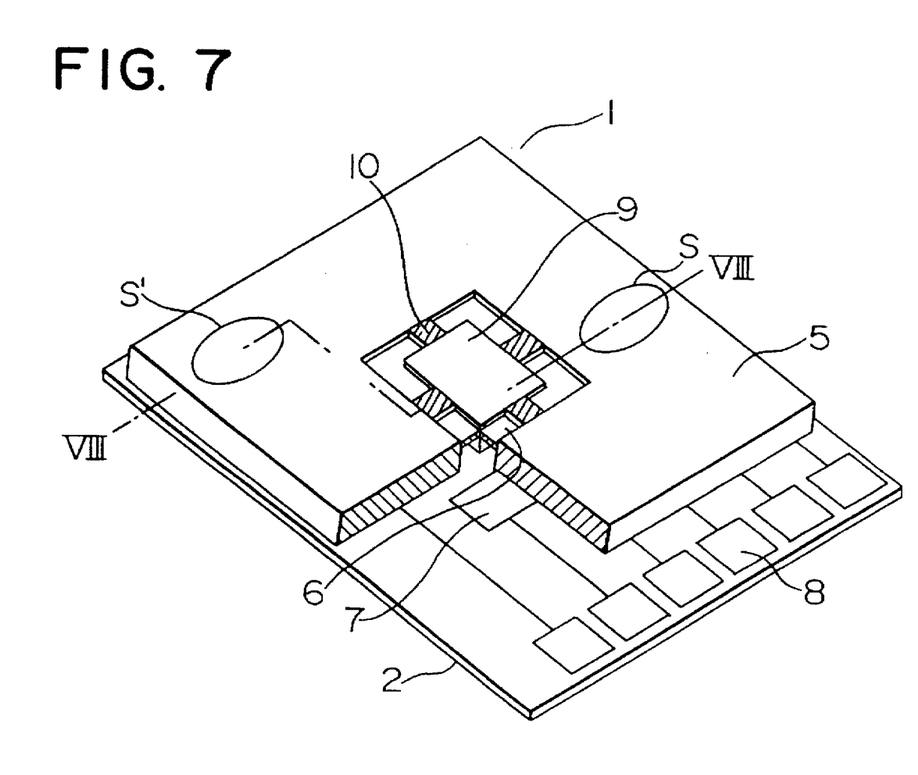
FIG. 7 is a perspective view showing a third embodiment of the three-dimensional acceleration sensor according to the invention.
Figure 8:
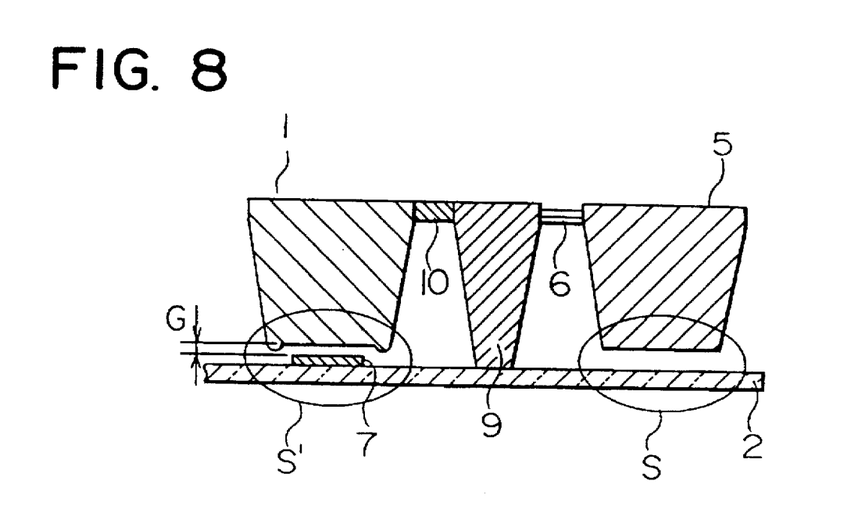
FIG. 8 is a sectional view taken on the line C–C' of FIG. 7.

FIGS. 7 and 8 show a third embodiment of the invention in which the frame 3 and diaphragm 4 connected thereto of the FIG. 1 structure are removed. Structurally, this embodiment can measure three-dimensional acceleration as in the case of the structure of FIGS. 5 and 6 and is advantageous in that the massive part 5 can operate lightly.

Figure 9:
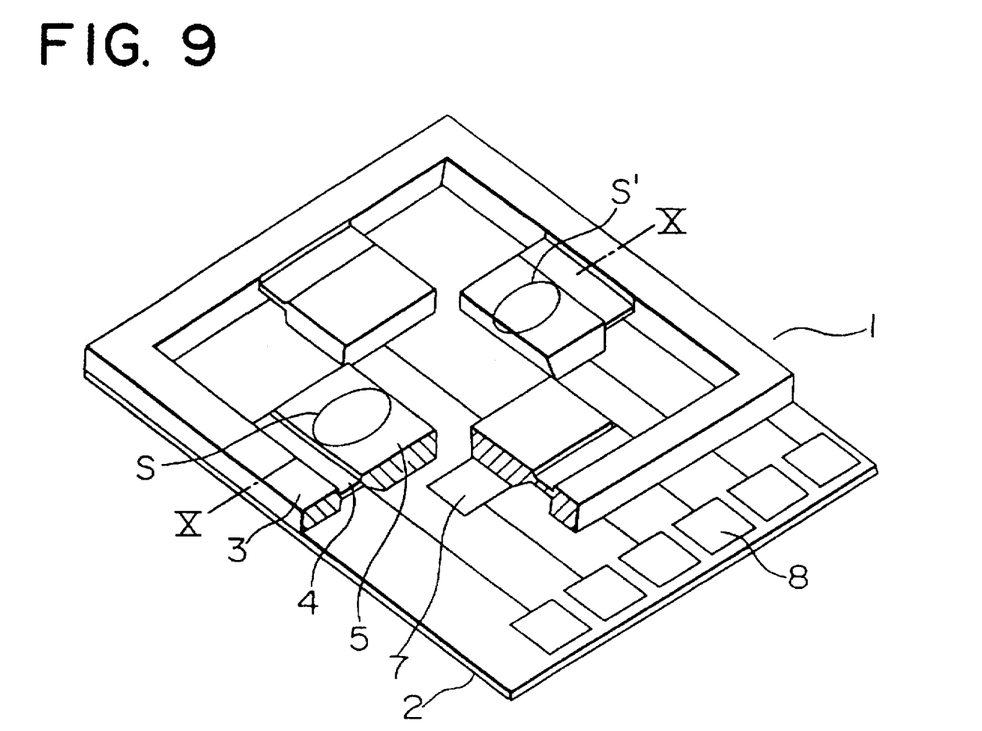
FIG. 9 is a perspective view showing a fourth embodiment of the three-dimensional acceleration sensor according to the invention.
Figure 10:
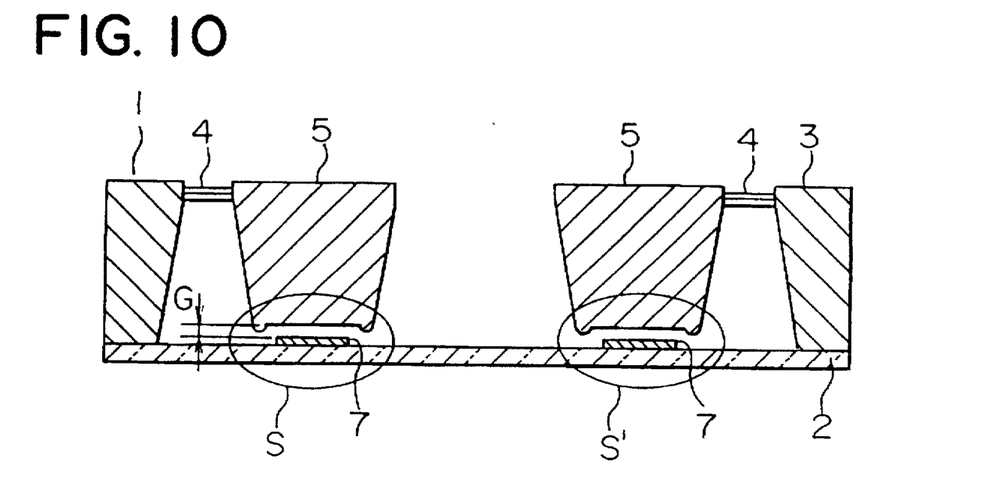
FIG. 10 is a sectional view taken on the line D–D' of FIG. 9.

FIGS. 9 and 10 show a fourth embodiment of the invention which has the same construction as that of FIGS. 5 and 6 with the only exception that the massive part 5 is divided into parts under which opposing electrodes 7 are provided. Structurally, this embodiment corresponds to a combination of four cantilevered unitary massive parts and, like the foregoing embodiments, can measure three-dimensional acceleration.

FIG. 11 shows a typical example of an arrangement of electrodes 7 for use in the previously-described structure of three-dimensional acceleration sensor. In FIG. 1 and other figures, wiring conductors extend from respective electrodes 7 to respective terminals 8 and disadvantageously the silicon plate 1 and glass plate 2 are jointed together by, for example, anodic bonding with a large gap necessary for taking out the wiring conductors remaining therebetween, so that filling the gap will be needed and/or a defective joint will occur. To cope with this problem, as exemplified in FIG. 11, wiring lines are established by etching technique in such a manner that the wiring lines first extend from the electrodes 7 toward a central region so as not to disturb balance of the massive part 5, then concentrate at an edge (dotted line position) of the silicon plate and finally go out of the silicon plate to connect to the respective terminals 8.

Figures 12, 12A:
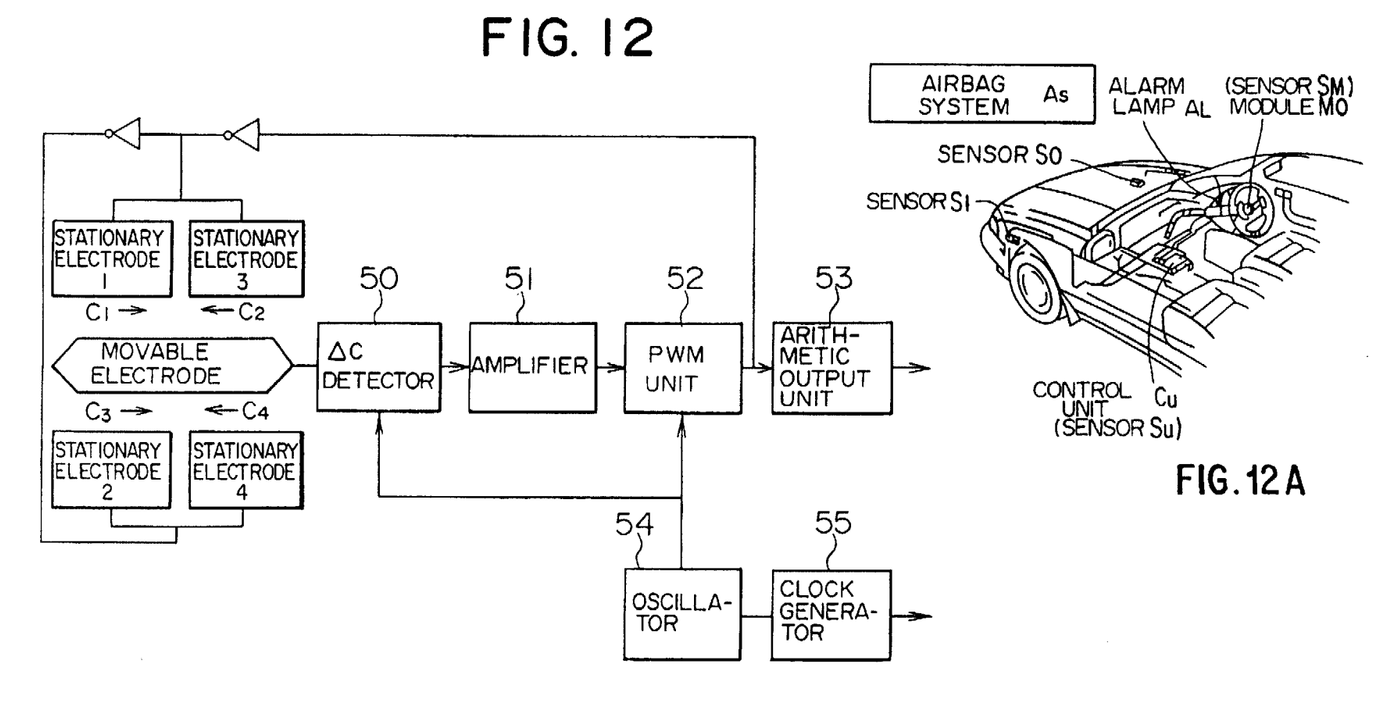
FIG. 12 is a block diagram of the three-dimensional acceleration sensor.

FIG. 12 shows a block diagram of the three-dimensional, semiconductor capacitive type acceleration sensor set forth so far. Illustrated therein is a circuit which detects a three-dimensional output by detecting changes in capacitances between a movable electrode corresponding to the massive part 5 and stationary electrodes $C_1$ to $C_4$ and by subjecting detection outputs to arithmetic processing. In FIG. 12, the circuit is depicted as being exemplarily applied to an airbag system and a vehicle control system. In the former application, the three-dimensional acceleration sensor of the invention capable of detecting a large acceleration value occurring in the event of a collision is used to produce an output based on which an airbag inflation is started.

The circuit of FIG. 12 is more specifically shown in FIG. 13. Advantageously, this specific circuit, in which electrostatic capacities C1, C2, C3, C4 correspond to the respective electrodes 7 in FIG. 11, is so constructed as to eliminate interference between signals in order to detect capacitance between each electrode and the massive part with high accuracy. To this end, signals are dephased from each other. Further, an arithmetic circuit for deciding the direction of applied acceleration is provided which produces output signals used to decide the applied acceleration direction.

A change in capacitance between each electrode and the massive part is detected by a AC detector 50, amplified by an amplifier unit 51 and modulated by a PWM unit (pulse width modulation unit) 52, thus providing signals to be operated by the arithmetic output unit 53 which in turn delivers voltage $V_1$ indicative of acceleration in the Z direction, voltage $V_2$ indicative of acceleration in the X direction and voltage $V_3$ indicative of acceleration in the Y direction, these voltages being used to decide three-dimensional acceleration.

Figure 14:
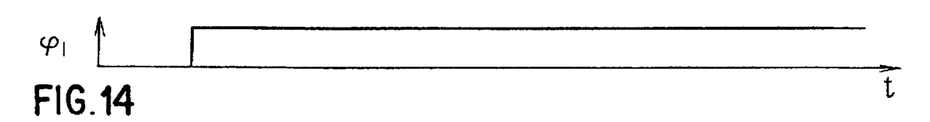
FIG. 14 is a timing chart for the three-dimensional acceleration sensor circuit.
Figure 14A:
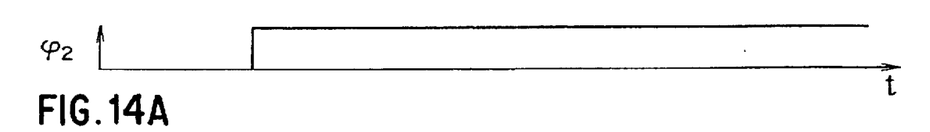
Figure 14B:
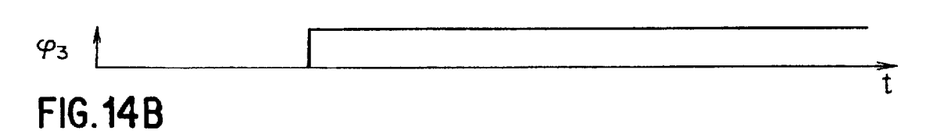
Figure 14C:
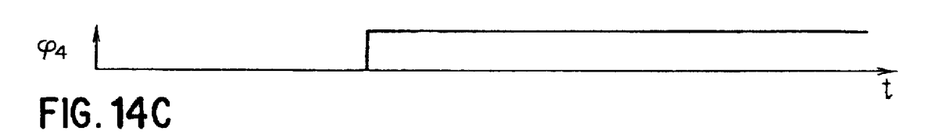
Figure 14D:
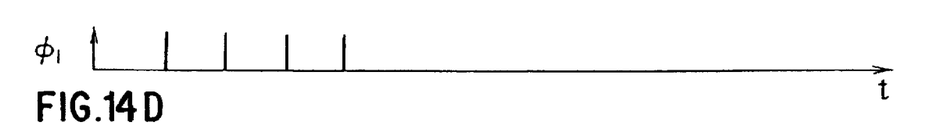
Figure 14E:
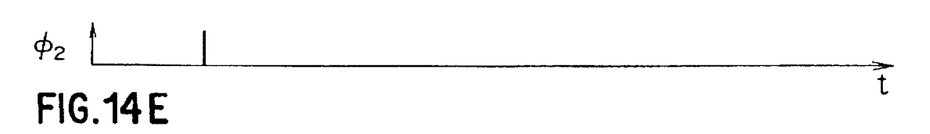
Figure 14F:
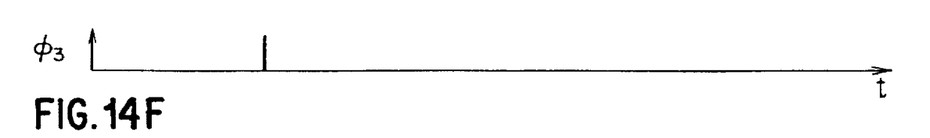
Figure 14G:
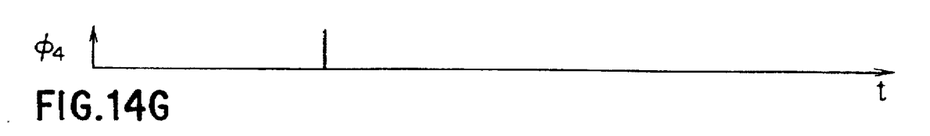
Figure 14H:
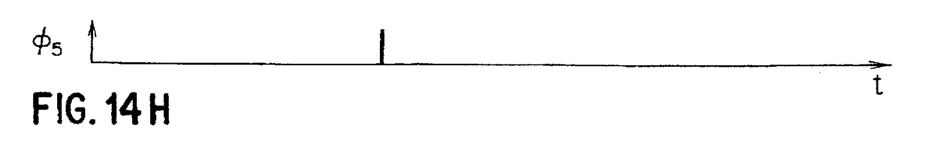

FIG. 14 is a timing chart for the circuit of FIG. 13. As will be seen from the illustration, signals $\phi 1$ to $\phi 4$ are dephased from each other. In the three-dimensional acceleration sensor of the invention, not only the beams 10 and diaphragms 6 for supporting the central part 9 are used in combination as described in the foregoing but also the beams or the diaphragms alone may be used.

Generally speaking, FIG. 14 shows the timing relationships between the driving signals $\phi 1$–$\phi 5$ generated by the clock generator 55 in FIG. 13 for being applied to gates in the circuit of FIG. 13 and the pulse width signals $\phi 1$–$\phi 4$ associated with the stationary electrodes C1–C4.

Referring to in FIGS. 13 and 14, as will be apparent now to one skilled in this art a driving signal 01 is applied to gate 101 from a clock generator 55. A condenser 102 is discharged to reset an integrator 103. Next, a PWM signal 01 rises, and the condenser 102 starts to be charged. The charging current of the condenser 102 is integrated by the integrator 103 and the integrator outputs a voltage proportional to the capacity C1. A driving signal 02 from the clock generator 55 opens a gate 104 to cause a sample/hold circuit 105 to keep the voltage proportional to the capacity C1. Thereafter, the driving signal 01 is again applied to the integrator 103 to reset it. Then, a PWM signal 02 is applied to the electrode of capacity C2 for charging thereof. The charging current thereof is integrated by the integrator 103. Next, a driving signal 03 is applied to a gate 106 and the voltage proportional to the capacity C2 is kept in a sample/hold circuit 107. By achieving the above operation in order, voltages proportional to capacities C1, C2, C3 and C4 are kept in sample/hold circuits 105, 107, 108 and 109, respectively.

The voltages in the sample/hold circuits 105, 107, 108 and 109 are amplified by amplifier 51, respectively, and converted by the PWM unit 52 into pulse width signals whose pulse widths are proportional to the voltages held in the sample/hold circuits, respectively. The pulse width signals S1, S2, S3 and S4 correspond to capacities C1, C2, C3 and C4.

An adding circuit 110 adds the pulse width signals S1 through S4, and rectifies and smooths the added signal. As a result, the output signal V1 of the adding circuit 110 indicates an acceleration value of the Z-direction. An adding circuit 111 receives difference signal V2 between added signals S1+S2 and S3+S4, as a result of which the output signal V2 becomes an acceleration value of the X-direction. An adding circuit 112 receives acceleration value of the Y-direction which is the difference signal between adding signals S1+S3 and S2+S4. Thus, the above-described three-dimensional acceleration values can be obtained.

Figure 15:
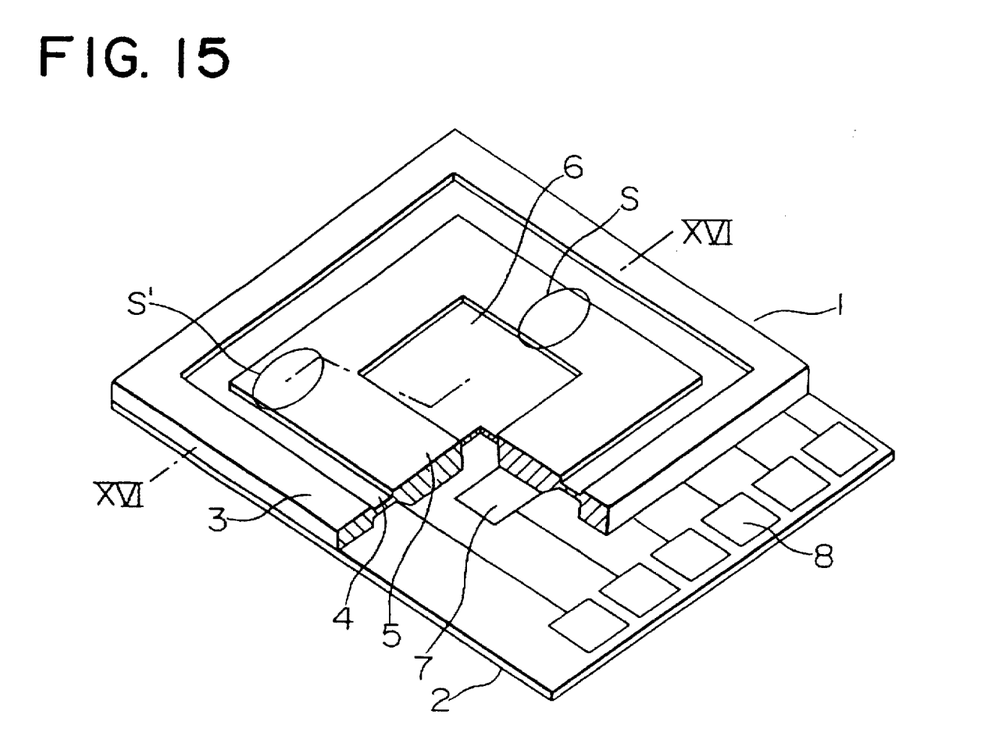
FIG. 15 is a perspective view showing a fifth embodiment of the three-dimensional acceleration sensor according to the invention.
Figure 16:
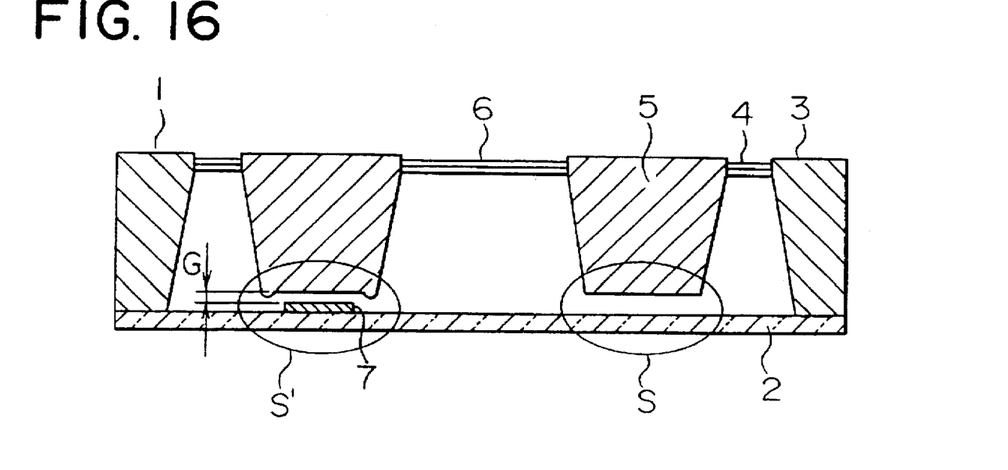
FIG. 16 is a sectional view taken on the line F–F' of FIG. 15.
Figure 17:
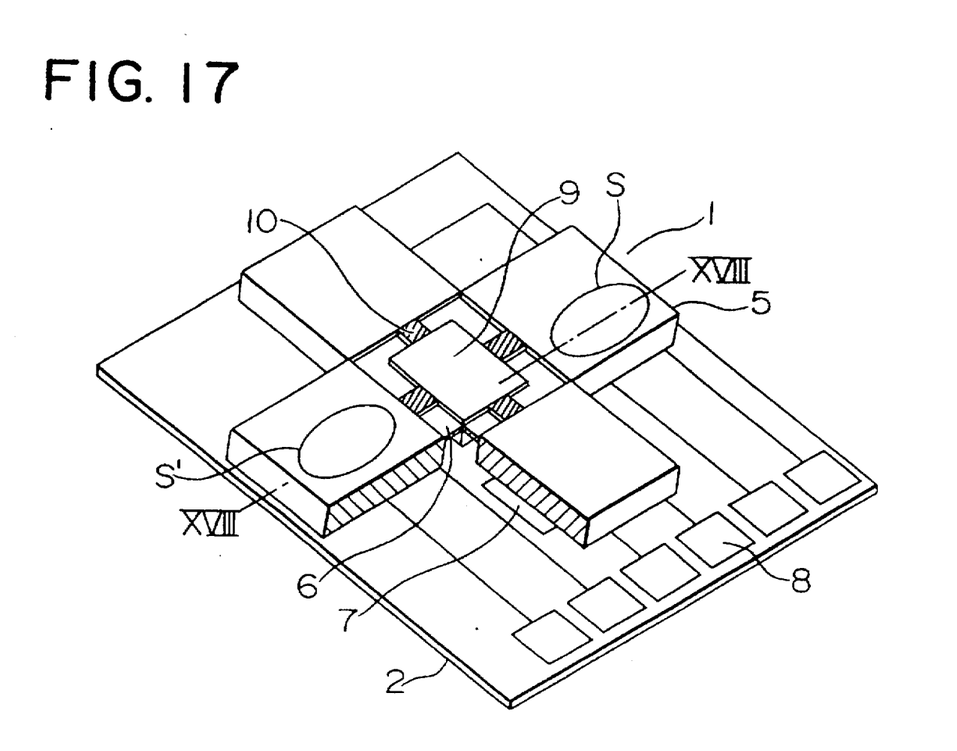
FIG. 17 is a perspective view showing a sixth embodiment of the three-dimensional acceleration sensor according to the invention.
Figure 18:
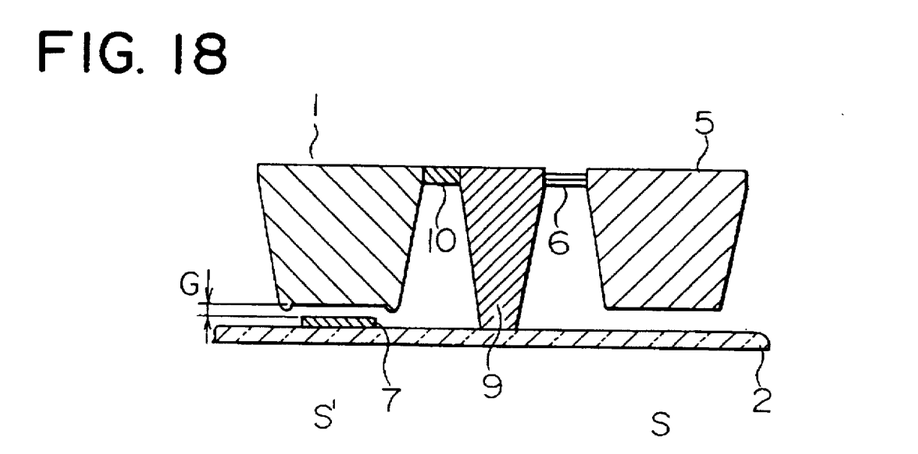
FIG. 18 is a sectional view taken on the line E–E' of FIG. 17.

In the embodiment of FIGS. 15 and 16, a massive part 5 has its outer side contiguous to a diaphragm 4 and its inner side contiguous to a diaphragm. Excepting a differently structured massive part 5, the embodiment of FIGS. 17 and 18 has the same construction as the FIG. 1 embodiment and with a simplified construction it can attain similar effects to those achieved by the FIG. 1 embodiment.

The acceleration sensor of the present invention can detect a small acceleration value occurring in car body control for automobiles and the like and besides a large acceleration value of, for example, 100 G caused by a collision.

In addition, inflow of dirts and the like into the detector can be prevented to prevent erroneous detection.

Figure 19:
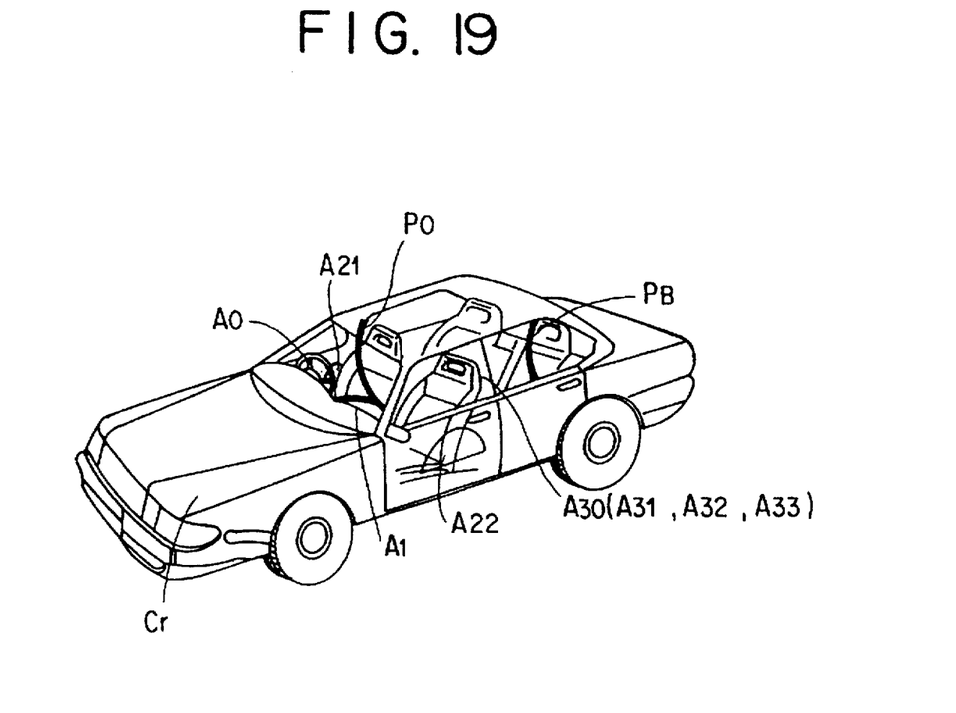
FIG. 19 is a perspective view showing the overall construction of a vehicle carrying an airbag system.
Figure 20:
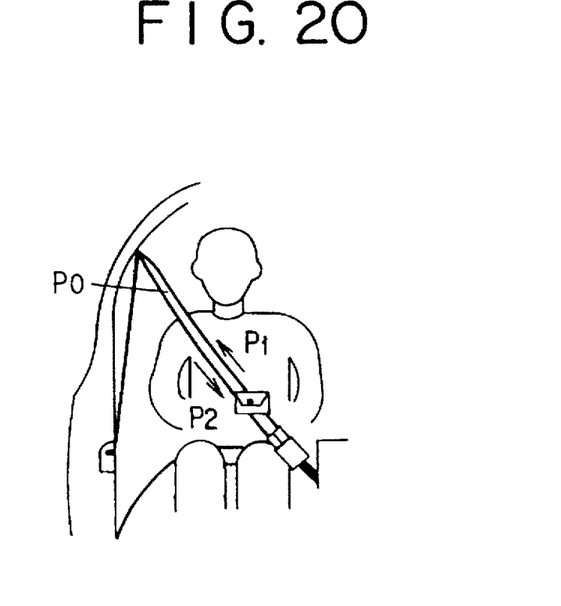
FIG. 20 is a diagram for explaining the operation of a seat-belt pre-tensioner.

In the airbag system, the airbag is inflated by the three outputs of the arithmetic output unit 53. As shown at the right-hand part in FIG. 12, in an airbag system As, many sensors can be used with their locations selected purposefully, including a sensor $S_0$ which is located by itself on the hood, a sensor $S_1$ which is located by itself on the side front, a sensor $S_M$ which is housed in a module $M_0$ and a sensor $S_u$ which is housed in a control unit $C_u$. The direction and magnitude of applied acceleration can be determined on the basis of outputs $V_1$ to $V_3$ of the acceleration sensor circuit shown in FIG. 13, and in accordance with the thus determined direction and magnitude, necessary airbags exemplified as an airbag $A_0$ for driver seat and an airbag $A_1$ for side seat in FIG. 19 are started to inflate. As will also be seen from FIG. 19, the arithmetic outputs $V_1$ to $V_3$ are used to not only inflate the airbags but also act on a seat-belt pre-tensioner $P_0$ and a 3-point seat belt for back seat $P_B$ in a direction of tightening $P_1$ or in a direction of loosening $P_2$ as shown in FIG. 20, so that the pre-tensioner $P_0$ and the seat belt $P_B$ can cooperate with the airbags to protect persons on board the vehicle.

Figure 21:
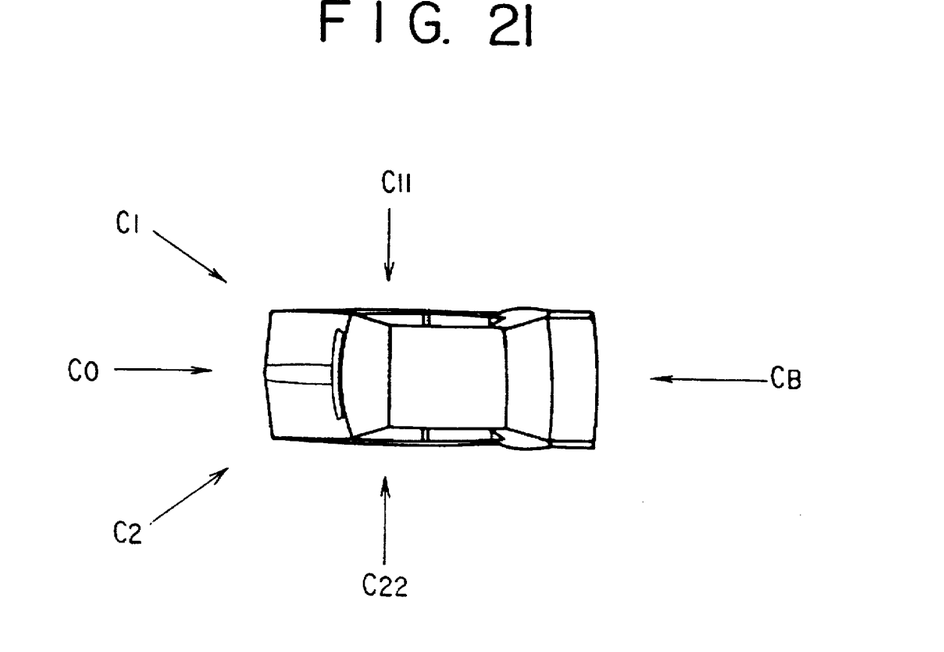
FIG. 21 is a plan view showing directions in which collisions of a vehicle occur.

The system for start and inflation of the airbags is operated in a manner which depends on a direction as shown in FIG. 21 in which a vehicle comes into collision with an obstacle. When a collision of the vehicle occurs in a frontal direction $C_0$ and the sensor $S_M$ generates a signal, outputs $V_2$ and $V_3$ in the X and Y directions are typically detected though depending on the location where the sensor $S_M$ is set. Similarly, when a collision occurs in a frontal, oblique direction $C_1$, it is determined that the level of $V_2$ decreases and the level of $V_3$ increases. Conversely, when acceleration is applied in a frontal, oblique direction $C_2$, it is detected that the level of $V_2$ increases and the level of $V_3$ decreases. In this manner, the direction and magnitude of applied acceleration can be determined to ignore and inflate an airbag at a necessary location. Similarly, when a collision occurs in a side direction $C_{11}$, the level of, for example, $V_3$ alone changes to ignore and inflate a side airbag $A_{21}$ shown in FIGS. 19 and 21. Conversely, when a collision occurs in a side direction $C_{22}$, a side bag $A_{22}$ is similarly started to inflate.

Likewise, in accordance with the differences in level among $V_1$ to $V_3$, the airbags for driver seat or side seat $A_0$ or $A_1$ are inflated and the seat-belt pre-tensioner $P_0$ is tightened or loosened and in accordance with the levels of $V_1$ to $V_3$, an airbag for back seat $A_{30}$ is started to inflate and the 3-point seat belt for back seat $P_B$ is tightened or loosened. The above operations are decided by the control unit $C_u$ as shown in a block diagram of FIG. 23 to drive individual devices of an actuator $A_C$ through a driver circuit $D_0$.

Figure 22:
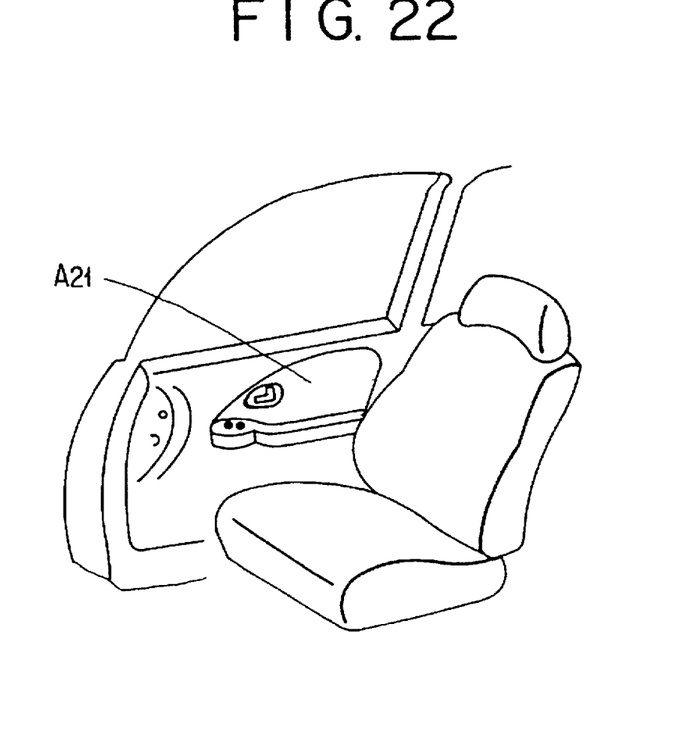
FIG. 22 is a fragmentary perspective view showing the location of a side airbag near the driver seat.

FIG. 22 illustrates the neighborhood of a door on the driver seat side, showing a location where the side airbag $A_{21}$ is housed. Even when a collision occurs in a rear, crash direction $C_B$, the levels of $V_1$ to $V_3$ are decided, thereby making it possible to start and inflate any one of airbag components $A_{31}$, $A_{32}$ and $A_{33}$ of the airbag for back seat $A_{30}$.

Figure 23:
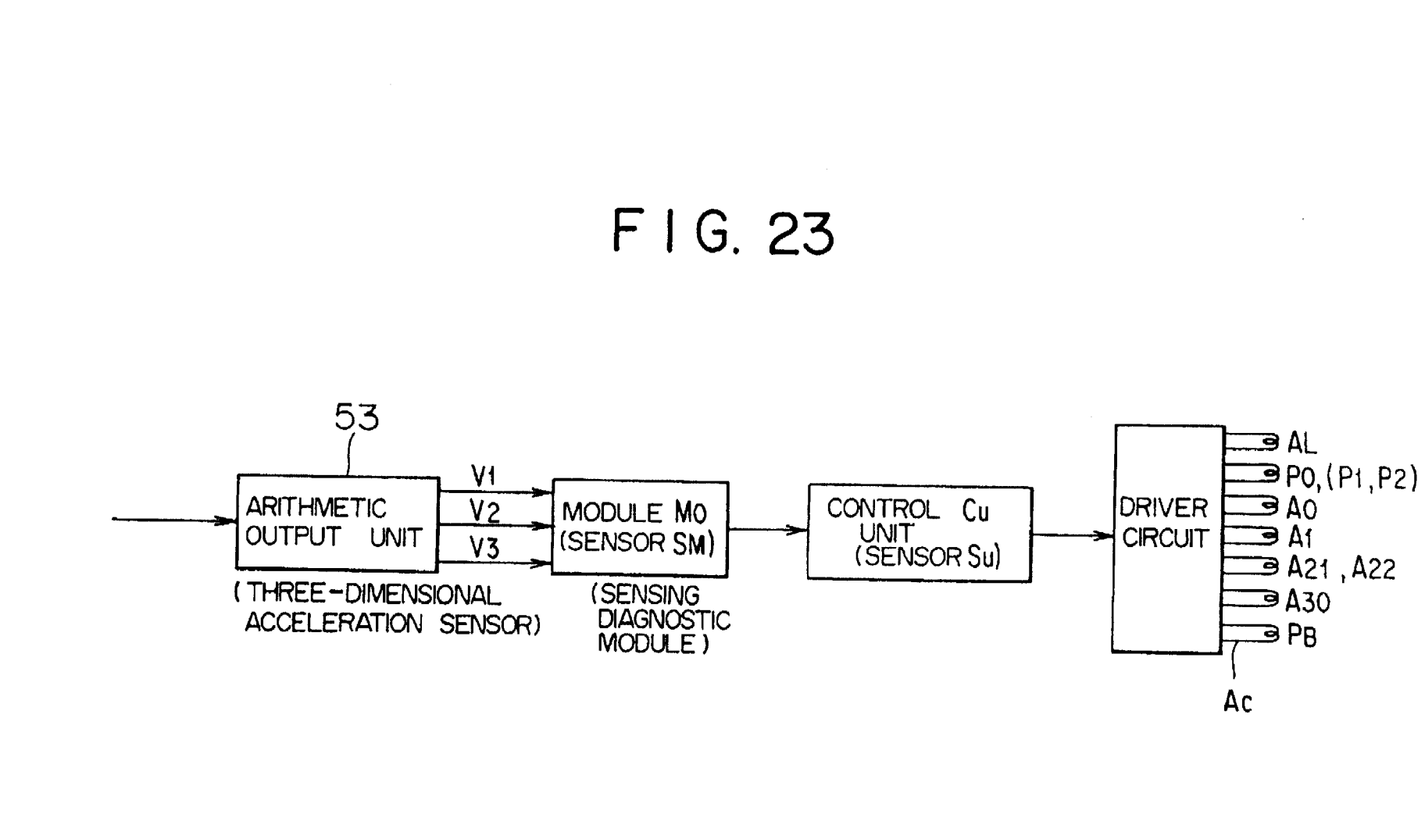
FIG. 23 is a block diagram of the airbag system.

The control unit $C_u$ shown in FIG. 23 decides on the basis of the direction and level of $V_1$ to $V_3$ which airbags, including the airbag for drive seat $A_0$, airbag for side seat $A_1$, side airbags $A_{21}$ and $A_{22}$ and airbag $A_{30}$ for back seat, should be started to inflate, and whether the seat-belt pre-tensioner $P_0$ and the 3-point seat belt for back seat $P_B$ are to be tightened in the $P_1$ direction or are to be loosened in the $P_2$ direction and the control unit $C_u$ generates a command in accordance with a result of decision. A drive circuit $D_0$ actuates one of the airbags and the pre-tensioners in accordance with the command from the control unit $C_u$.

Even when a value of acceleration up to 100 G is applied to the vehicle having a crushable body $C_r$, the system of FIG. 23 operates to drive an alarm lamp $A_L$, the airbags $A_0$ and $A_1$ and the like.

When the respective airbags and the seat-belt pre-tensioner $P_0$ are driven under the application of acceleration as represented by $V_1$ to $V_3$, the alarm lamp $A_L$ is concurrently turned on. In addition thereto, when diagnosis is carried out using the sensing diagnostic module of the module $M_0$, the alarm lamp $A_L$ serves as a dummy load for inspection and test and is lit to examine the system.

Even with a structure in which the module $M_0$ is housed in the handle and the three-dimensional acceleration sensor $S_M$ is housed in the module $M_0$ as shown at the right-hand part in FIG. 12, the built-in three-dimensional acceleration sensor $S_M$ is immune from the rotary operation of the handle so as not to disturb the present system, thus permitting highly accurate detection.

When the airbag system As is driven using the present three-dimensional acceleration sensor, the system can be operated with high accuracy by dephasing signals to eliminate interference among the signals in the circuit for controlling the sensors, as shown in FIG. 14.

We claim:

1. An airbag system comprising: a three-dimensional acceleration sensor having a support on which a stationary electrode is arranged, a central part fixed to said support, a single massive part acting as a movable electrode and a link member for interconnecting said central part and said massive part; said link member being comprised of a combination of diaphragms and beams which are operatively provided around said central part; and means for starting an airbag on the basis of an output of an arithmetic output unit of said three-dimensional acceleration sensor, wherein means is provided for sensing changed electrical capacitance between the stationary electrode and the single massive part at four positions thereof, and means is further provided for detecting applied acceleration in response to changes in sensed electrical capacitance at the four positions by addition and subtraction of changes in electrical capacitance values.

2. The airbag system according to claim 1, wherein said central part has a square form and said beams are provided at respective sides of the square form.

3. The airbag system according to claim 1, wherein said detecting means comprises a circuit configured to decide the direction of applied acceleration by detecting changes in capacitance between said massive part and a plurality of opposing stationary electrodes.

4. The airbag according to claim 3, wherein wiring lines are etched on the support from the stationary electrodes and are configured to avoid disturbing balance of said massive part.

5. A airbag system according to claim 1, wherein a distance between an electrode portion of said massive part and said stationary electrode is larger than a distance between said support and said massive part.

6. The airbag system according to claim 5, wherein said detecting means comprises a circuit which decides the direction of applied acceleration by detecting changes in capacitances between said massive part and a plurality of opposing stationary electrodes.

7. The airbag system according to claim 6, wherein wiring lines are etched on the support from the stationary electrodes and are configured to avoid disturbing balance of said massive part.

8. The airbag system according to claim 1, wherein a frame surrounds said single massive part, and an additional diaphragm links said frame and said single massive part.

9. The airbag system according to claim 1, further comprising a frame surrounding said single massive part, a link member comprised of a diaphragm and linking said frame and said single massive part, said means for sensing changed electrical capacitance between the stationary electrode and the single massive part being at four positions of the single massive part, and means for detecting applied acceleration in response to changes in sensed electrical capacitance at the four positions by addition and substraction of changes in electrical capacitance values.

10. The airbag system according to claim 9, wherein a distance between an electrode and said massive part is larger than a distance between said support and said massive part.

* * * * *